United States Patent
Jin et al.

(10) Patent No.: US 6,492,932 B1
(45) Date of Patent: Dec. 10, 2002

(54) SYSTEM AND METHOD FOR PROCESSING SQUINT MAPPED SYNTHETIC APERTURE RADAR DATA

(75) Inventors: Michael Y. Jin, Pasadena; Michael E. Lawrence, San Pedro, both of CA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/880,244

(22) Filed: Jun. 13, 2001

(51) Int. Cl.$^7$ .................................................. G10S 13/90

(52) U.S. Cl. ...................... 342/25; 342/162; 342/196; 342/192

(58) Field of Search ............................... 342/25, 89, 91, 342/99, 159, 160, 161, 162, 191, 192, 194, 195, 196

(56) References Cited

U.S. PATENT DOCUMENTS

| | | | | |
|---|---|---|---|---|
| 4,851,848 A | * | 7/1989 | Wehner ........................ | 342/25 |
| 4,985,704 A | * | 1/1991 | Smith ........................... | 342/25 |
| 5,179,383 A | * | 1/1993 | Raney et al. .................. | 342/25 |
| 5,307,070 A | * | 4/1994 | Runge et al. .................. | 342/25 |
| 5,448,241 A | * | 9/1995 | Zeoli et al. .................... | 342/25 |
| 5,608,404 A | * | 3/1997 | Burns et al. ................... | 342/25 |
| 6,144,333 A | * | 11/2000 | Cho ............................. | 342/149 |

FOREIGN PATENT DOCUMENTS

EP         298112 A   *   1/2000

OTHER PUBLICATIONS

Walker, J. L., "Range–Doppler Imaging of Rotating Objects", Ph.D. dissertation, University of Michigan, 1974.

Walker, J. L., "Range–Doppler Imaging of Rotating Objects", IEEE Transactions on Aerospace and Electronic Systems, vol. AES–16, No. 1, Jan. 1980, pp23–52.

U.S. patent No. 4,191,957, J. L. Walker and W. G. Carrara, "Method of Processing Radar Data from a rotating Scene Using a Polar Recording Format", Mar. 4, 1980.

Wu, C., "a digital system to produce imagery from SAR data", Paper 76–968, AIAA Systems Design Driven by Sensors, Pasadena, California, Oct. 18–20, 1976.

Jin. M. Y., and Wu, C., "A SAR correlation algorithm which accommodates large–range migration", IEEE Transactions on Geoscience and Remote Sensing, GE–22(6), pp 592–597, 1984.

Rocca, F., C. Cafforio, and C. Prati, "Synthetic Aperture Radar: A New Application for Wave Equation Techniques", Geophysical Prospecting 37, 1989, pp 809–830.

Raney, R. K., H. Runge, R. Bamler, I. G. Cumming, and F. H. Wong, "Precision SAR Processing Using Chirp Scaling", IEEE Transactions on Geoscience and Remote Sensing, vol. 32, No. 4, Jul. 1994, pp 786–799.

* cited by examiner

Primary Examiner—John B. Sotomayor
(74) Attorney, Agent, or Firm—Daly, Crowley & Mofford, LLP

(57) ABSTRACT

A method for processing squint-mapped synthetic aperture radar data of the present invention. The inventive method includes the steps of effecting range compression of the data; deskewing the data; performing a Fourier transform with respect to the deskewed data; providing a range migration interpolation of the transformed data; effecting a frequency remapping of the range interpolated data; and performing an inverse Fourier transform with respect to the deskewed data.

4 Claims, 3 Drawing Sheets

FIG. 4
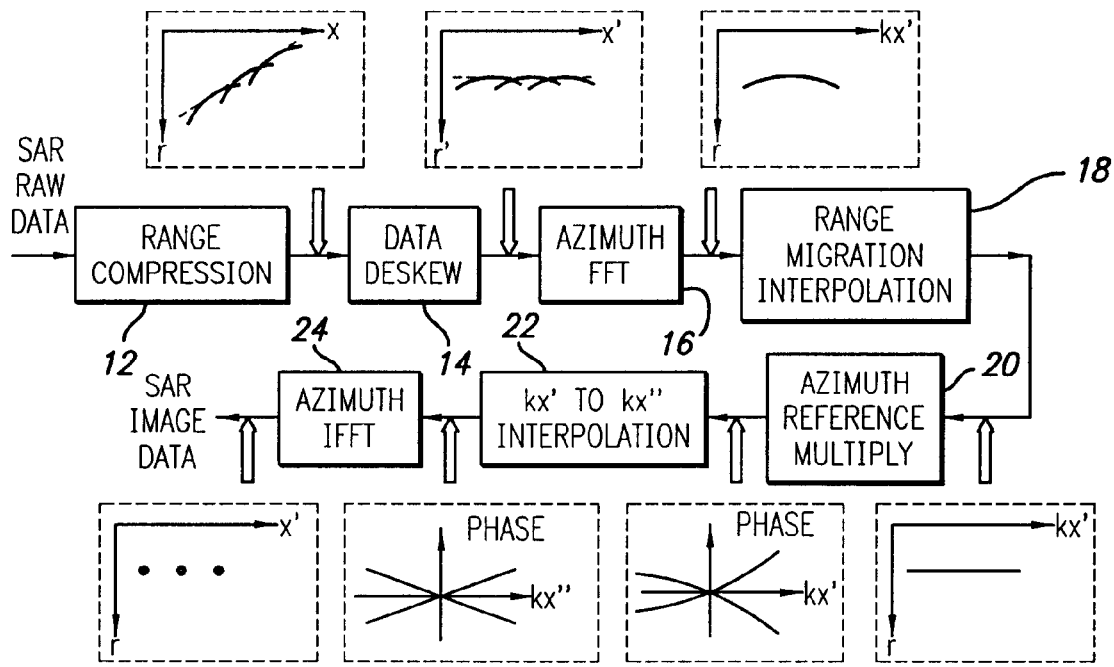
FIG. 4a  FIG. 4b  FIG. 4c
FIG. 4g  FIG. 4f  FIG. 4e  FIG. 4d
FIG. 5
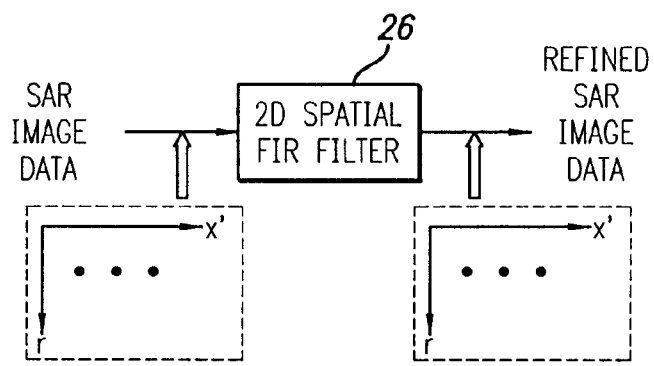
FIG. 5a  FIG. 5b

SYSTEM AND METHOD FOR PROCESSING SQUINT MAPPED SYNTHETIC APERTURE RADAR DATA

BACKGROUND OF THE INVENTION

1. Field of the Invention

The present invention relates to radar. More specifically, the present invention relates to systems and methods for synthetic aperture radar signals.

2. Description of the Related Art

Radar systems are used for a variety of applications. For certain applications, certain types of radar are preferred. For example, for numerous aircraft and satellite applications, synthetic aperture radar (SAR) is frequently used. A synthetic aperture radar images targets on the ground from the air. (See "Radar" *Microsoft® Encarta® Encyclopedia* 2000) A SAR system uses the movement of an airplane or satellite carrying it to make the antenna seem much larger than it is. The ability of radar to distinguish between two closely spaced objects depends on the width of the beam that the antenna sends out. The narrower the beam, the better its resolution. A narrow beam requires a large antenna. A SAR system is limited to a relatively small antenna with a wide beam because it must fit on an aircraft or satellite. SAR systems are called synthetic aperture, however, because the antenna appears to be larger than it is. This is because the moving aircraft or satellite allows the SAR system to repeatedly take measurements from different positions. An on-board or ground based processor processes these signals to make it seem as though they came from a large stationary antenna instead of a small moving one. This is the principle by which a SAR achieves its fine resolution in along-track. To achieve a fine resolution in the cross-track, a pulse compression technique is usually employed. This technique enables high signal-to-noise ratio by transmitting long wideband pulses and achieves a high range resolution by pulse compression to effectively converting long pulses into short ones.

Synthetic aperture radar resolution can be high enough to pick out individual objects as small as automobiles. Typically, an aircraft or satellite equipped with SAR flies past the target object. In inverse synthetic aperture radar, the target moves past the radar antenna.

SAR mapping is typically performed over an angle of 90° degrees relative to the velocity vector of the vehicle. An angle of greater or less than 90° is referred to as a "squint angle". SAR mapping with a squint angle is often necessary to overcome a flight path restriction in an airborne SAR or an orbit constraint in a space-borne SAR. Processing SAR data collected with a squint angle has been a challenging task due to the constantly changing distance between the radar and a ground target. This so called 'range walk' effect makes the line-like azimuth response of the targets skewed with respect to the along-track direction.

Two decades ago, the main problems associated with processing this data were the cost of large memory required to store the intermediate two-dimensional data and the degraded impulse response due to lack of processing algorithms designed for squint mapping. In recent years, memory cost has been dramatically reduced and high quality processing algorithms have been proposed. Prior approaches for processing squint mode SAR data include the (1) polar format algorithm, (2) range-Doppler algorithm (RDA) and RDA with secondary range compression, (3) range migration algorithm (RMA), and (4) chirp scaling algorithm (CSA).

Unfortunately, there are many disadvantages associated with these prior approaches. For example, the disadvantages associated with polar format algorithm in squint mode processing include (1) a discontinuity of pixel amplitude and phase among image subpatches and (2) considerable complexity associated with the subpatch approach. Further, the range-Doppler algorithm with secondary range compression can handle squint mode data up to certain angle limit. Beyond that limit, the performance of its impulse response is greatly reduced.

In the RMA and CSA approaches, azimuth compression involves two-dimensional Fast Fourier Transforms (FFT). To achieve optimal efficiency, range compression is usually integrated with azimuth compression. This makes it very difficult to efficiently integrate other processes including autofocus, impulse response weighting, and radiometric compensation into the processing chain.

In short, these algorithms have been difficult to optimize with respect to the efficiency of the entire processing chain including autofocus processing, impulse response weighting, coordinate rotation, and radiometric compensation. In addition, due to the complexity of these algorithms, the cost associated with software development and maintenance has been relatively high.

Hence, a need remains in the art for an improved system or method for processing squint-mapped synthetic aperture radar data.

SUMMARY OF THE INVENTION

The need in the art is addressed by the system and method for processing squint-mapped synthetic aperture radar data of the present invention. The inventive method includes the steps of effecting range compression of the data; deskewing the data; performing a Fourier transform with respect to the deskewed data; providing a range migration interpolation of the transformed data; effecting a frequency remapping of the range interpolated data; and performing an inverse Fourier transform with respect to the deskewed data.

After the data deskew operation, it might appear that one could perform azimuth compression in the azimuth dimension using a range-Doppler algorithm. However, targets lying in the same range bin but different azimuth angles are associated with different focusing parameters. Therefore, a unique azimuth reference function will not be able to focus all targets in the same range bin. In accordance with the present teachings, this problem is addressed by performing a frequency remapping process for the azimuth spectra after the range migration interpolation and an azimuth reference multiply operation. This removes the quadratic phase term associated with each target such that after inverse azimuth FFT focused impulse response will be achieved.

For some SAR systems where the focusing parameter difference in one range bin is significant such that a single range migration curve cannot approximate all targets, slight degradation would occur on the final impulse response. In accordance with the present teachings, a spatial variant filter, with a small two-dimensional spatial kernel, may be added to provide post impulse compression.

BRIEF DESCRIPTION OF THE DRAWINGS

FIG. 4 is a diagram showing a system for processing squint mode SAR data in accordance with the teachings of the present invention.

FIG. 4(a) is a graph that depicts the output of the range compression routine of the system for processing squint mode SAR data in accordance with the teachings of the present invention.

FIG. 4(b) is a graph that shows the output of the data deskew routine of the system for processing squint mode SAR data in accordance with the teachings of the present invention.

FIG. 4(c) is a graph depicting the output of the azimuth FFT operation of the system for processing squint mode SAR data in accordance with the teachings of the present invention.

FIG. 4(d) is a graph that depicts the output of the range migration interpolation operation of the system for processing squint mode SAR data in accordance with the teachings of the present invention.

FIG. 4(e) is a graph depicting the output of the azimuth reference multiply operation of the system for processing squint mode SAR data in accordance with the teachings of the present invention.

FIG. 4(f) is a graph that depicts the output of the frequency remapping operation of the system for processing squint mode SAR data in accordance with the teachings of the present invention.

FIG. 4(g) is a graph depicting the output of the azimuth inverse FFT operation of the system for processing squint mode SAR data in accordance with the teachings of the present invention.

FIG. 5 is a diagram that depicts the 2D spatial fir filter.

FIG. 5(a) is a graph that depicts the input of the 2D spatial filter.

FIG. 5(b) is a graph that depicts the output of the 2D spatial filter.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The original range-Doppler algorithm was formulated in the coordinates including range, slow time, and Doppler. In accordance with the extended range-Doppler processing method of the present invention, coordinates are formulated including range (r), along-track coordinate (x), azimuth coordinate (x'), and their corresponding frequency space $k_r$, $k_x$, and $k_x'$.

Figure 1:
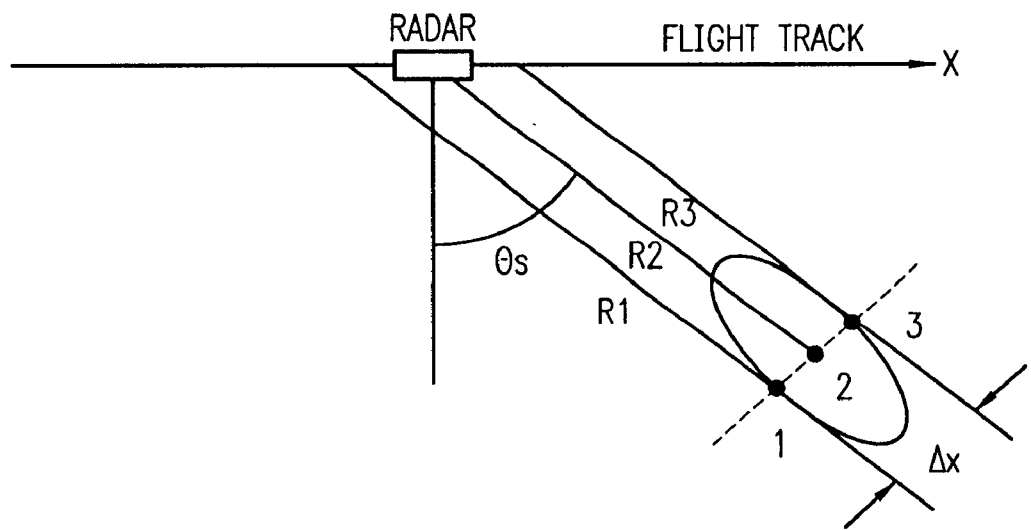
FIG. 1 is a diagram which depicts the squint mode mapping geometry of a conventional synthetic aperture radar in the slant plane.

FIG. 1 is a diagram which depicts the squint mode mapping geometry of a conventional synthetic aperture radar in the slant plane. The squint angle is $\theta_s$. In the radar footprint, there are three point-like targets 1, 2, and 3 within the same line perpendicular to the line of sight direction between the radar and the center of footprint. Targets 1 and 3 are at the edge of the footprint defined by $\Delta x$.

The range history of target 2 is given by $$r2(x) = \sqrt{(x - R2 \cdot \sin\theta_s)^2 + (R2 \cdot \cos\theta_s)^2} \qquad (1)$$
$$= \sqrt{x^2 - 2 \cdot x \cdot R2 \cdot \sin\theta_s + R2^2}$$

Its Taylor expansion is:

$$r2(x) = R2 \cdot \sin\theta_s \cdot x + \frac{1}{2} \frac{\cos^2\theta_s}{R2} \cdot x^2 + \qquad (2)$$
$$\frac{1}{6} \cdot \frac{3(\sin\theta_s - \sin^3\theta_s)}{R2^2} \cdot x^3.$$

Numerical analysis indicates that the higher order terms are very small as compared to the wavelength.

Figure 2A:
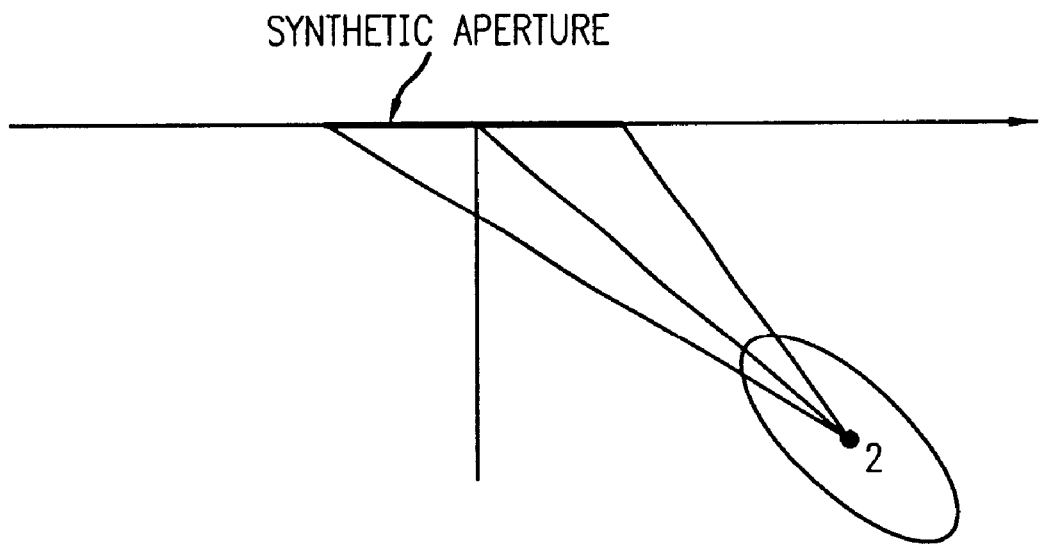
FIG. 2a is a diagram depicting slant range histories for target two over a synthetic aperture.
Figure 2B:
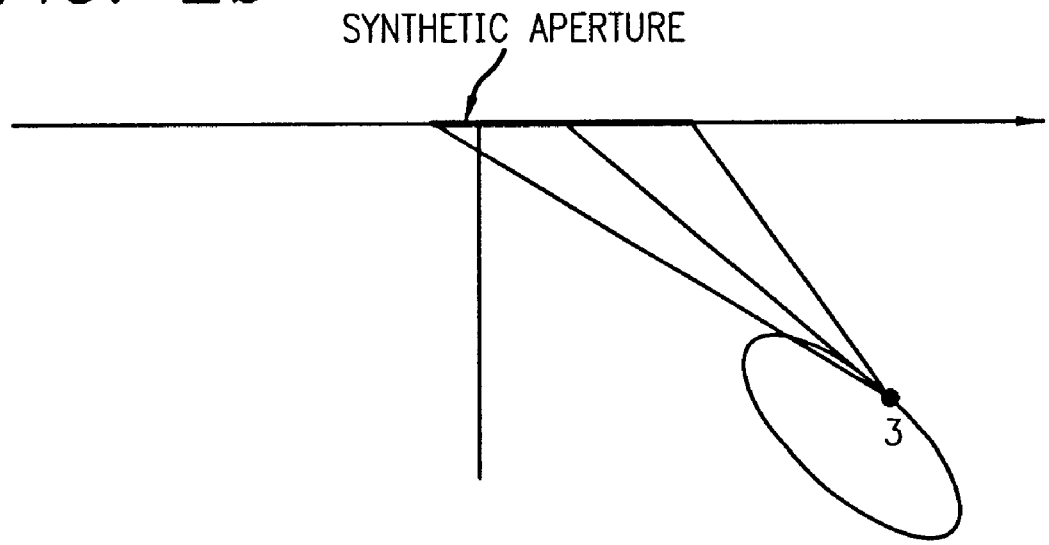
FIG. 2b is a diagram depicting slant range histories for target three over a synthetic aperture.

FIGS. 2a and 2b are diagrams depicting slant range histories for target 2 and target 3 over a synthetic aperture. The slant range histories for target 1 and target 3 over their own synthetic aperture are given by:

$$r1\left(x - \frac{\Delta x}{2 \cdot \cos\theta_s}\right) = \frac{R1}{R2} \cdot r2(x) \qquad \text{where } x \in \left[-\frac{\Delta x}{2 \cdot \cos\theta_s}\frac{R1}{R2}, \frac{\Delta x}{2 \cdot \cos\theta_s}\frac{R1}{R2}\right] \qquad (3)$$

$$r3\left(x + \frac{\Delta x}{2 \cdot \cos\theta_s}\right) = \frac{R3}{R2} \cdot r2(x), \qquad \text{where } x \in \left[-\frac{\Delta x}{2 \cdot \cos\theta_s}\frac{R3}{R2}, \frac{\Delta x}{2 \cdot \cos\theta_s}\frac{R3}{R2}\right]$$

where $R1 = R2 + \Delta x/2 \cdot \tan\theta_s$ and $R3 = R2 - \Delta x/2 \cdot \tan\theta_s$.

The point-target response of target 2 in range compressed form can be shown as $$S2(r,x) = \text{sinc}(r - r_d(x)) \cdot \exp\{j\theta 2(x)\} \qquad (4)$$

where $$r_d(x) = r2(x) - r_0 \quad \text{and} \quad \theta 2(x) = -\frac{4\pi}{\lambda} \cdot r2(x).$$

$r_0$ is the new range reference in the collected data to remove a large range bias due to the mapping distance.

In equation (4), this response is a sharp impulse along the range dimension with impulse response following a SINC function. This is based on the assumption that no range impulse weighting is applied. In the x dimension, it is a slightly curved line. The shape of the line follows $r_d(x)$. Along this curved line, S2(r,x) is approximately a linear FM signal except a small third order term (see equation (2)).

Data Deskew (Coordinate Transformation)

In squint mode SAR processing, range compression is performed first for the raw data. In accordance with a present teachings, after range compression, a data deskew is performed. This removes the linear part of the range migration such that the point target response is similar to that of a broadside case. The advantage is that the spectrum of a point-target response may follow that in the original range-Doppler formulation. This deskew includes range translation and azimuth distance scaling. This coordinate transformation may be viewed as a change of flight path from x to x' as shown in FIG. 3.

Figure 3:
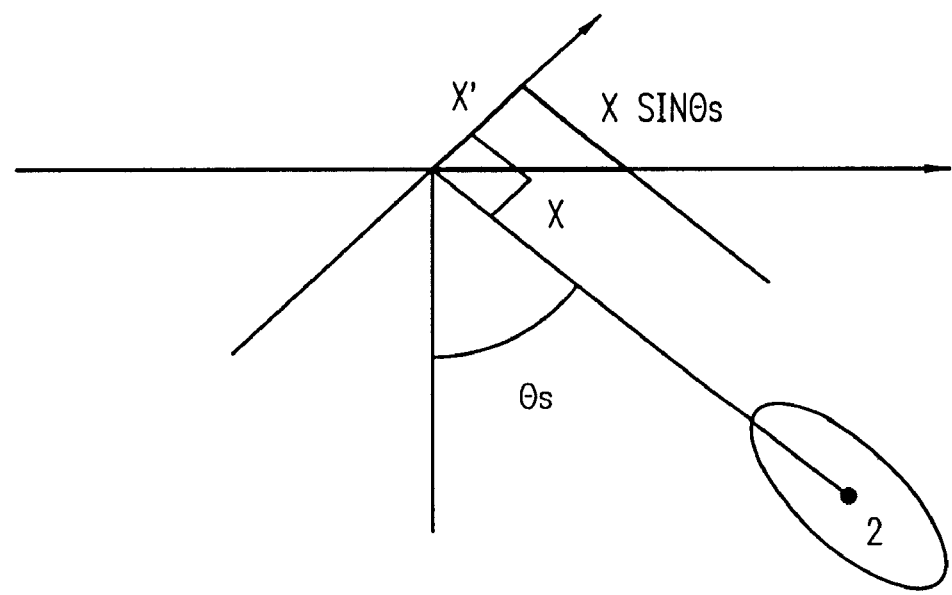
FIG. 3 is a diagram depicting a platform for raw data deskewing in accordance with conventional teachings.

FIG. 3 is a diagram depicting a platform for raw data deskewing in accordance with conventional teachings. The new coordinate is given by $$x' = x \cdot \cos \theta_s$$
$$r' = r + x \cdot \sin \theta_s \quad (5)$$

In this new coordinate system, the point-target response of target in range compressed form is given by $$S2(r', x') = \mathrm{sinc}(r' - r'_d(x')) \cdot \exp\{j\theta 2(x')\} \quad (6)$$

where $$r'_d(x') = R2 - r_0 + \frac{x'^2}{2 \cdot R2} + \frac{(\sin \theta_s - \sin^3 \theta_s)}{2 \cdot R2^2 \cdot \cos^3 \theta_s} \cdot x'^3 \quad (7)$$

and $$\theta 2(x') = -\frac{4\pi}{\lambda}\left(R2 - r_0 + \frac{x'^2}{2 \cdot R2} + \frac{(\sin \theta_s - \sin^3 \theta_s)}{2 \cdot R2^2 \cdot \cos^3 \theta_s} \cdot x'^3\right) \quad (8)$$

Equation (7) indicates that the point-target response after deskew follows a range migration path with mainly the second order term similar to that of a broadside case. It should be noted that there is a small third order term in the range migration $r'_d(x')$. Similarly, the phase term in equation (8) is also dominated by the second order term with a minor third order term.

Azimuth Spectrum of Point-target Response

The range-Doppler algorithm is based on the formulation of the azimuth spectrum of the point-target response. This is the Fourier transform of the point-target response in the azimuth direction only. The azimuth spectrum should be in the form of $$\hat{S}2(r', kx') = \mathrm{sinc}(r' - \hat{r}_d(kx')) \cdot \exp\{j\psi 2(kx')\} \quad (9)$$

To derive expressions for $\hat{r}_d(kx')$ and $\psi 2(kx')$, one needs to get the Fourier transform of $\exp\{j\theta 2(x')\}$ first, i.e.:

$$F(\exp\{j\theta 2(x')\}) = \int \exp\{j\theta 2(x')\} \cdot \exp\{-kx' \cdot x'\} \cdot d\,x' \quad (10)$$
$$= \exp\{j\psi 2(kx')\}$$

Simplifying $\theta 2(x')$:

$$\theta 2(x') = -\frac{4\pi}{\lambda}(R2 - r_0) + a2 \cdot x'^2 + a3 \cdot x'^3 \quad (11)$$

According to stationary phase principle, the result of equation (10) is obtained by inserting the value of the stationary phase point into $\theta 2(x') - kx' \cdot x'$. The stationary phase point may be derived from $$\left.\frac{d}{dx'}(a2 \cdot x'^2 + a3 \cdot x'^3 - kx' \cdot x')\right|_{x' = x'_0} = 0 \quad (12)$$

The solution of equation (12) is $$x'_0 \cong \frac{kx'}{2 \cdot a2}.$$

Therefore $\psi 2$ (kx') in equation (10) may be expressed as $$\psi 2(kx') = -\frac{4\pi}{\lambda}(R2 - r_0) + \left(\frac{\lambda \cdot R2}{8\pi} \cdot kx'^2 - \left(\frac{\lambda}{4\pi}\right)^2 \frac{(\sin \theta_s - \sin^3 \theta_s) \cdot R2}{2 \cdot \cos^3 \theta_s} \cdot kx'^3 - \frac{\pi}{4}\right) \quad (13)$$

The range migration path for equation (9) is therefore given by $$\hat{r}_d(kx') \cong -\frac{\lambda}{4\pi} \cdot \theta 2\left(\frac{kx'}{2 \cdot a2}\right) \quad (14)$$

Given the azimuth spectrum of a point-target, one may process the deskew data using the range-Doppler processing method of the present invention.

FIG. 4 is a diagram showing a system for processing squint mode SAR data in accordance with the teachings of the present invention. As shown in the block diagram in FIG. 4, the range-Doppler processing system performs an azimuth FFT, range migration interpolation, azimuth reference multiply, and inverse azimuth FFT. Those skilled in the art will appreciate that, in the best mode, the system depicted in FIG. 1 will be implemented in software in a microprocessor. Raw SAR data supplied from a conventional synthetic aperture radar antenna and receiver with an analog to digital converter (none of which are shown), is provided to a range compression routine 12. FIG. 4(a) depicts the output of the range compression routine. Next, the data deskew operation is performed by routine 14. FIG. 4(b) shows the output of the data deskew routine. The deskewed data is Fast Fourier Transformed in azimuth by routine 16. FIG. 4 (c) depicts the output of the azimuth FFT operation. Next range migration interpolation is performed by routine 18. The output of this routine is shown in FIG. 4(d). These data are multiplied by an azimuth reference value in routine 20. FIG. 4(e) shows the output of this routine.

With squint mode data, the focusing parameter varies with the azimuth position, therefore, further processing is required before the inverse azimuth FFT. This process is referred to as kx' to kx" interpolation. The form of the azimuth reference function and the kx' to kx" interpolation are described below.

In accordance with the present teachings, the output of the azimuth reference multiply routine is interpolated from kx' to kx". FIG. 4(f) shows the output of this interpolation. Next, an inverse azimuth FFT operation is performed by routine 24. FIG. 4(g) shows the output of the inverse FFT transformation.

The operation of the system is disclosed more fully below.

Azimuth Reference Function

In azimuth compression, the azimuth reference function removes the phase variation in the spectrum of point-target response. This is achieved simply by letting the phase of the azimuth reference function be the negative of the target phase excluding its constant term. Hence, $$\psi_{ref}(kx') = -\left(\frac{\lambda \cdot R2}{8\pi} \cdot kx'^2 - \left(\frac{\lambda}{4\pi}\right)^2 \frac{(\sin\theta_s - \sin^3\theta_s) \cdot R2}{2 \cdot \cos^3\theta_s} \cdot kx'^3 - \frac{\pi}{4}\right) \quad (15)$$

Frequency Remapping (kx' to kx" Interpolation)

Excluding the constant term, the phase of the spectrum of the three point-targets shown in FIG. 1 are given by:

$$\psi 2(kx') = \frac{\lambda \cdot R2}{8\pi} \cdot kx'^2 - \left(\frac{\lambda}{4\pi}\right)^2 \frac{(\sin\theta_s - \sin^3\theta_s) \cdot R2}{2 \cdot \cos^3\theta_s} \cdot kx'^3 \quad (15a)$$

$$\psi 1(kx') = \frac{\lambda \cdot R1}{8\pi} \cdot kx'^2 - \left(\frac{\lambda}{4\pi}\right)^2 \frac{(\sin\theta_s - \sin^3\theta_s) \cdot R1}{2 \cdot \cos^3\theta_s} \cdot kx'^3 + \frac{\Delta x}{2} \cdot kx' \quad (15b)$$

$$\psi 3(kx') = \frac{\lambda \cdot R3}{8\pi} \cdot kx'^2 - \left(\frac{\lambda}{4\pi}\right)^2 \frac{(\sin\theta_s - \sin^3\theta_s) \cdot R3}{2 \cdot \cos^3\theta_s} \cdot kx'^3 - \frac{\Delta x}{2} \cdot kx' \quad (15c)$$

After the azimuth reference function is multiplied by these responses, the third order phase term is negligibly small for all targets. This is not true for the second order term. The phase of the spectra of three point-targets can be approximated as $$\Delta\psi 2(kx') = \psi 2(kx') + \psi_{ref}(kx') \approx 0 \quad (16a)$$

$$\Delta\psi 1(kx') \cong \frac{\lambda \cdot (R1-R2)}{8\pi} \cdot kx'^2 + \frac{\Delta x}{2} \cdot kx' \quad (16b)$$

$$= \frac{\lambda \cdot \tan\theta_s}{8\pi} \cdot \frac{\Delta x}{2} \cdot kx'^2 + \frac{\Delta x}{2} \cdot kx'$$

$$\Delta\psi 3(kx') \cong \frac{\lambda \cdot (R3-R2)}{8\pi} \cdot kx'^2 - \frac{\Delta x}{2} \cdot kx' \quad (16c)$$

$$= \frac{\lambda \cdot \tan\theta_s}{8\pi} \cdot \frac{\Delta x}{2} \cdot kx'^2 - \frac{\Delta x}{2} \cdot kx'$$

For $\theta_s = 0$, these phases are given by:

$$\Delta\psi 2(kx') = 0, \quad \Delta\psi(kx') = \frac{\Delta x}{2} \cdot kx', \quad \text{and} \quad \Delta\psi 3(kx') = -\frac{\Delta x}{2} \cdot kx'$$

The inverse Fourier transform operation performed by the routine 24 leads to three point targets located at $$-\frac{\Delta x}{2}, 0, \text{ and } \frac{\Delta x}{2}.$$

In accordance with the present teachings, the quadratic phase term in equation (16) is removed by changing the coordinate kx' into a new frequency coordinate kx" defined by:

$$kx'' = \left(\frac{\Delta x}{2}\right)^{-1} \cdot \left(\frac{\lambda \cdot \tan\theta_s}{8\pi} \cdot \frac{\Delta x}{2} \cdot kx'^2 + \frac{\Delta x}{2} \cdot kx'\right) \quad (17)$$

In order to transform from kx' to kx", one needs to find the solution of kx' with a given kx". This solution is simply:

$$kx' = \left(\frac{\lambda \cdot \tan\theta_s}{4\pi}\right)^{-1} \cdot \left(-1 + \sqrt{1 + \frac{\lambda \cdot \tan\theta_s}{2\pi} \cdot kx''}\right) \quad (18)$$

2D Spatial Filter

In range migration interpolation, the range migration curve follows that of the target located at the beam center. Therefore, there is some mismatch between this curve and those of the targets located at the edge of the beam. For most SAR systems, this mismatch is very slight such that there will be no noticeable degradation in the final impulse response. However, for some other SAR systems, it may cause noticeable degradation in the final impulse response. In such cases, a 2D spatial filter 26, shown in FIG. 5, could be added to correct for the degradation. The range migration curve selected in the range migration interpolation follows the high order terms of equation (7), i.e.:

$$r_M(x') = \frac{x'^2}{2 \cdot R2} + \frac{(\sin\theta_s - \sin^3\theta_s)}{2 \cdot R2^2 \cdot \cos^3\theta_s} \cdot x'^3 \quad (19)$$

where R2 is the slant range of the target at the beam center.

For targets away from the beam center, the slant range shall differ from R2. Consider a target with an azimuth distance of dx from the beam center, its slant range shall be R=R2+dx·tan $\theta_s$. Therefore, its range migration curve is given by:

$$r_{M-dx}(x') \cong \frac{x'^2}{2 \cdot (R2 + dx \cdot \tan\theta_s)} + \frac{(\sin\theta_s - \sin^3\theta_s)}{2 \cdot R2^2 \cdot \cos^3\theta_s} \cdot x'^3 \quad (20)$$

In the two-dimensional spatial frequency, the deviation in the range migration curve leads to uncompensated phase of $$\Delta\psi(kx', kr) = -kr \cdot \frac{R2^2}{2 \cdot dx \cdot \tan\theta_s} \cdot kx'^2 \quad (21)$$

The kernel of the 2D spatial filter is therefore given by the inverse Fourier transform of exp{$\Delta\psi$(kx',kr), i.e.:

$$h(x,r) = FFT_{2D}^{-1}\{\exp\{\Delta\psi(kx',kr)\}\} \quad (22)$$

FIG. 5(b) depicts the output of the 2D spatial filter.

Thus, the present invention has been described herein with reference to a particular embodiment for a particular application. Those having ordinary skill in the art and access to the present teachings will recognize additional modifications, applications and embodiments within the scope thereof It is therefore intended by the appended claims to cover any and all such applications, modifications and embodiments within the scope of the present invention.

Accordingly,

What is claimed is:

1. A system for processing squint-mapped synthetic aperture radar data comprising:

first means for effecting range compression of the data;

second means for effecting a coordinate transformation with respect to the data;

third means for performing a Fourier transform with respect to the transformed data;

fourth means for providing a range migration interpolation of the transformed data;

fifth means for removing phase variations in the range interpolated data;

sixth means for effecting a frequency remapping of the range interpolated data; and-seventh means for performing an inverse Fourier Transform with respect to the frequency remapped data.

2. The invention of claim 1 further including a two-dimensional spatial filter coupled to the output of the seventh means.

3. A method for processing squint-mapped synthetic aperture radar data including the steps of:

effecting range compression of the data;

deskewing the data;

performing a Fourier transform with respect to the deskewed data;

providing a range migration interpolation of the transformed data;

effecting a frequency remapping of the range interpolated data; and performing an inverse Fourier transform with respect to the frequency remapped data.

4. The invention of claim 3 further including the step of performing a two-dimensional spatial filter of the inverse transformed data.

* * * * *

UNITED STATES PATENT AND TRADEMARK OFFICE
CERTIFICATE OF CORRECTION

PATENT NO.   : 6,492,932 B1
DATED        : December 10, 2002
INVENTOR(S)  : Michael Y. Jin et al.

It is certified that error appears in the above-identified patent and that said Letters Patent is hereby corrected as shown below:

Column 1,
Line 26, reads "are called synthetic aperture, however, because" and should read -- are sometimes called a synthetic aperture, because --.

Column 4,
Line 65, reads "with a present" and should read -- with present --.

Column 5,
Line 18, reads "target in range" and should read -- target 2 in range --.

Column 6,
Line 44, reads "deskew routine" and should read -- deskew routine 14. --.

Column 8,
Line 41, reads "2D spatial filter" and should read -- 2D spatial FIR filter 26. --.

Signed and Sealed this

Twelfth Day of August, 2003

JAMES E. ROGAN
*Director of the United States Patent and Trademark Office*